United States Patent [19]

Yoshida et al.

[11] Patent Number: 5,275,879
[45] Date of Patent: Jan. 4, 1994

[54] MAGNETIC RECORDING MEDIUM CONTAINING CARBON BLACK HAVING SPECIFIC PROPERTIES

[75] Inventors: Osamu Yoshida; Yutaka Sano; Shingo Hashimoto, all of Tochigi, Japan

[73] Assignee: KAO Corporation, Tokyo, Japan

[21] Appl. No.: 858,482

[22] Filed: Mar. 27, 1992

[30] Foreign Application Priority Data

Apr. 30, 1991 [JP] Japan .................................. 3-099029

[51] Int. Cl.$^5$ .............................................. B32B 5/16
[52] U.S. Cl. .................................. 428/323; 252/62.51; 252/62.55; 252/62.56; 428/694 BN; 428/900
[58] Field of Search ....................... 428/323, 900, 694; 252/62.51, 62.55, 62.56

[56] References Cited

U.S. PATENT DOCUMENTS

| | | | |
|---|---|---|---|
| 4,988,562 | 1/1991 | Ryoke et al. | 428/323 |
| 5,026,598 | 6/1991 | Koyama et al. | 428/323 |
| 5,089,331 | 2/1992 | Ryoke et al. | 428/323 |

*Primary Examiner*—Paul J. Thibodeau
*Assistant Examiner*—H. Thi Lê
*Attorney, Agent, or Firm*—Birch, Stewart, Kolasch & Birch

[57] ABSTRACT

A magnetic recording medium having excellent durability and containing carbon black having a mean particle diameter of 25 to 130 nm, a BET specific surface area of 30 to 80 m$^2$/g and an oil absorption of 300 to 500 ml/100 g which is incorporated into a magnetic layer of a magnetic recording medium.

8 Claims, No Drawings

MAGNETIC RECORDING MEDIUM CONTAINING CARBON BLACK HAVING SPECIFIC PROPERTIES

BACKGROUND OF THE INVENTION

1. Field of the Invention

The present invention relates to a magnetic recording medium and more particularly to a magnetic recording medium which is particularly excellent in durability.

2. Description of the Related Art

Carbon black is usually contained in a magnetic layer of a magnetic recording medium. The carbon black is used for the purpose of imparting a light shielding property and an antistatic performance to the magnetic recording medium. There is also a proposal on the combined use of two types of carbon black, which differ from each other in particle diameter, for the purpose of imparting better lubricity to the recording medium.

Studies on the relationship between the selection of carbon black and the durability of the magnetic recording medium containing carbon black have not always been sufficient.

SUMMARY OF THE INVENTION

Accordingly, an object of the present invention is to conduct studies from the above-described point of view and to provide a magnetic recording medium having excellent durability.

The present inventors have made extensive and intensive studies with a view toward attaining the above-described object and, as a result, have discovered that the incorporation of a carbon black having a mean particle diameter of 25 to 130 nm, a BET specific surface area of 30 to 80 $m^2/g$ and an oil absorption of 300 to 550 ml/100 g into a magnetic coating leads to the formation of such a structure that the carbon black gathers in the magnetic layer to a certain extent and a lubricant is properly held in the structure, which contributes to an improvement in the durability of the magnetic recording medium. This has led to the completion of the present invention.

Accordingly, the present invention provides a magnetic recording medium comprising a non-magnetic substrate and, provided thereon, a magnetic layer, wherein the magnetic layer comprises a binder, a magnetic powder and a carbon black having a mean particle diameter of 25 to 130 nm, a BET specific surface area of 30 to 80 $m^2/g$ and an oil absorption of 300 to 550 ml/100 g.

The magnetic layer preferably contains a polyurethane having a polar group as at least part of the binder.

The polar group is preferably an alkali metal salt of sulfonic acid present in an amount of 0.2 to 1000 $eq/10^6$ g, more preferably sodium sulfonate group.

The magnetic layer preferably contains 5 to 12 parts by weight of the carbon black having a mean particle diameter of 25 to 130 nm, a BET specific surface area of 30 to 80 $m^2/g$ and an oil absorption of 300 to 550 ml/100 g based on 100 parts by weight of the magnetic powder.

Furthermore, the present invention provides a magnetic composition utilized as a magnetic layer in a magnetic recording medium, the magnetic composition comprising a binder, a magnetic powder and carbon black having a mean particle diameter of 25 to 130 nm, a BET specific surface area of 30 to 80 $m^2/g$ and an oil absorption of 300 to 550 ml/100 g.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The magnetic recording medium of the present invention comprises a non-magnetic substrate and a magnetic layer provided thereon.

Examples of the non-magnetic substrate to be used in the production of the magnetic recording medium of the present invention include polyesters such as polyethylene terephthalate; polyolefins such as polyethylene and polypropylene; cellulose derivatives such as cellulose triacetate and cellulose diacetate; polycarbonates; polyvinyl chloride; polyimides; plastics such as aromatic polyamides; metals such as Al and Cu; and paper. The substrate may be in the form of a film, a tape, a sheet, a disk, a card, a drum, etc. The substrate may have a surface treated with corona discharge, radiation, ultraviolet rays or the like, or precoated with a suitable resin.

The magnetic layer of the magnetic recording medium of the present invention comprises a binder, a magnetic powder and a carbon black having a mean particle diameter of 25 to 130 nm, a BET specific surface area of 30 to 80 $m^2/g$ and an oil absorption of 300 to 550 ml/100 g.

The binder to be used in the present invention is preferably a polyurethane resin having a polar group, and the polar group is preferably an alkali metal salt of sulfonic acid. The concentration of the polar group is preferably 0.2 to 1000 $eq/10^6$ g, more preferably 1 to 100 $eq/10^6$ g.

Examples of other binders to be used in the present invention include polyvinyl chloride, vinyl chloride/vinyl acetate copolymer, polyacrylonitrile, nitrile rubbers, epoxy resins, alkyd resins, polyamides, polyacrylates, polymethacrylates, polyvinyl acetate, polyvinyl butyral, vinylidene chloride, nitrocellulose, maleic acid modified vinyl chloride/vinyl acetate copolymer and ethylcellulose. The binders may be used alone or in the form of a mixture of two or more. The total amount of binder utilized is preferably 15 to 40% by weight, more preferably 15 to 30% by weight, based on the weight of the magnetic powder.

Examples of the magnetic powder to be used in the present invention include acicular fine metal oxides such as $\gamma\text{-}Fe_2O_3$, $Fe_3O_4$ and $CrO_2$; processed powders of $\gamma\text{-}Fe_2O_3$ such as Co-coated $\gamma\text{-}Fe_2O_3$ and Co-doped $\gamma\text{-}Fe_2O_3$; and iron metal powder. Among the magnetic powders, iron metal powder, small plate-like barium ferrite, magnetic powder comprising barium ferrite wherein part of the iron atoms are substituted with at least one of Ti, Co, Zn, V, Nb, etc., and ultrafine powders of metals and alloys such as Co, Fe-Co and Fe-Ni are particularly poor in chemical stability. In order to improve their chemical stability, it is possible that small amounts of nickel, cobalt, titanium, silicon, aluminum, etc., in the form of a metal atom, a metal salt of a metal oxide, are added to the magnetic powder, or the magnetic powder has a surface thereof treated with the above-described metals. Such a magnetic powder which is improved in chemical stability may also be used in the present invention. In the case of iron metal powder, a thin oxide film may be formed on the surface thereof in a weak oxidizing atmosphere, for stabilization. Such a treated iron metal powder may also be used in the present invention.

The use of the carbon black specified in the present invention leads to the formation of such a structure that the carbon black gathers in a magnetic layer to some extent. This allows a lubricant to be properly held in the structure, which gives rise to a suitable surface roughness, so that an improvement in the durability in the magnetic recording medium is observed at both low and high temperatures. In this case, although a structure is formed such that the magnetic powders gather, this does not bring about a lowering in the electromagnetic conversion characteristics.

The carbon black commonly used in the conventional magnetic recording medium has an oil absorption of about 50 to 150 ml/100 g and about 250 ml/100 g at the highest. On the other hand, the carbon black according to the present invention is characterized by having an oil absorption as high as 300 to 550 ml/100 g. The adsorption of dibutyl phthalate (DBP) is represented as an oil adsorption.

The carbon black to be used in the present invention has a mean particle diameter of 25 to 130 nm, a BET specific surface area of 30 to 80 $m^2/g$ and an oil absorption of 300 to 550 ml/100 g, and the amount utilized is preferably 5 to 12 parts by weight based on 100 parts by weight of the magnetic powder.

The carbon black specified in the present invention may be used in combination with another carbon black for the purpose of imparting a light shielding property, an antistatic performance or lubricity.

The magnetic layer of the magnetic recording medium according to the present invention may contain, besides the above-described components, additives commonly used in the art, such as dispersants, lubricants, abrasives, rust preventives and fungicides.

When the magnetic layer according to the present invention is produced by coating a magnetic composition onto a substrate, it is also possible to use a curing agent, such as polyisocyanate compound, in the magnetic coating for the purpose of regulating the hardness of the magnetic layer.

EXAMPLES

The present invention will now be described in more detail with reference to the following Examples, though it is not limited to these Examples only. In the Examples, "parts" and "%" are by weight unless otherwise specified.

EXAMPLE 1

A floppy disk was made by using the following magnetic coating:

| [Formulation of the magnetic coating] | |
|---|---|
| magnetic powder (Co-coated $\gamma$-$Fe_2O_3$) | 100 parts |
| nitrocellulose (BTK ½ manufactured by Asahi Chemical Industry Co., Ltd.) | 15 |
| polyurethane resin containing sodium sulfonate group (uR 8200 manufactured by Toyobo Co., Ltd.) | 15 |
| carbon black a[1] | 10 |
| carbon black b[2] | 10 |

| [Formulation of the magnetic coating] | |
|---|---|
| alumina | 10 |
| tridecyl stearate | 8 |
| curing agent (Coronate L manufactured by Nippon Polyurethane Industry Co., Ltd.) | 6 |

Note:
[1]mean particle diameter: 38 nm, BET specific surface area: 40 $m^2/g$, and oil absorption: 500 ml DBP/100 g wherein DBP represents dibutyl phthalate.
[2]mean particle diameter: 80 nm, BET specific surface area: 35 $m^2/g$, and oil absorption: 27 ml DBP/100 g.

The raw materials for a magnetic coating other than a curing agent were kneaded in a ball mill for 72 hours, and 6 parts of a curing agent was added thereto to prepare a magnetic coating. The magnetic coating was applied on a 75 $\mu$m-thick polyethylene terephthalate film to form a coating having a thickness of 2.5 $\mu$m on a dry basis. After the coated film was dried it was calendered and a disk was punched therefrom to give a magnetic disk. The magnetic disk was put in a case to prepare a floppy disk.

The floppy disk was placed in a drive to conduct a durability test. The test environment was cyclically changed over a period of 24 hours in the following manner:

$$5° C./20\% \rightarrow 25° C./80\% \rightarrow 60° C./20\%$$

As a result, the number of passes (necessary for the output to be reduced to 70% of the initial output) was 30,000,000 or more.

COMPARATIVE EXAMPLES 1 AND 2

Floppy disks were prepared in the same manner as that of Example 1, except that in the formulation of the magnetic coating, the carbon black a was not used, and 10 parts or 20 parts of the carbon black b was used. The floppy disks were subjected to the same test as that of Example 1. As a result, in both the floppy disks, the number of passes was 5,000,000.

COMPARATIVE EXAMPLE 3

A floppy disk was prepared in the same manner as that of Example 1, except that in the formulation of the magnetic coating, 10 parts of a carbon black having a mean particle diameter of 30 nm, a BET specific surface are of 65 $m^2/g$ and an oil absorption of 50 ml DBP/100 g was used instead of the carbon black a. The floppy disk was subjected to the same test as that of Example 1. As a result, the number of passes was 5,000,000.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim:

1. A magnetic recording medium comprising a nonmagnetic substrate, and provided thereon, a magnetic layer, wherein the magnetic layer comprises a binder, a magnetic powder and carbon black having a mean particle diameter of 25 to 130 nm, a BET specific surface area of 30 to 80 m²/g and an oil absorption of 300 to 550 ml/100 g.

2. The magnetic recording medium according to claim 1, wherein the magnetic layer contains a polyurethane having a polar group as at least part of the binder.

3. The magnetic recording medium according to claim 2, wherein the polar group is an alkali metal salt of sulfonic acid present in an amount of 0.2 to 100 eq. $10^6$ g of polyurethane.

4. The magnetic recording medium according to claim 2, wherein the polar group is a sodium sulfonate group.

5. The magnetic recording medium according to claim 1, wherein the magnetic layer contains 5 to 12 parts by weight of the carbon black having a mean particle diameter of 25 to 130 nm, a BET specific surface area of 30 to 80 m²/g and an oil absorption of 300 to 550 ml/100 g based on 100 parts by weight of the magnetic powder.

6. A magnetic composition utilized as a magnetic layer in a magnetic recording medium, the magnetic composition comprising a binder, a magnetic powder and carbon black having a mean particle diameter of 25 to 130 nm, a BET specific surface area of 30 to 80 m²/g and an oil absorption of 300 to 550 ml/100 g.

7. The magnetic recording medium according to claim 1, wherein said binder is present in a total amount of 15 to 40% by weight, based on the weight of said magnetic powder.

8. The magnetic composition according to claim 6, wherein said binder is present in a total amount of 15 to 40% by weight, based on the weight of said magnetic powder.

* * * * *